US012193132B2

(12) United States Patent
Lee et al.

(10) Patent No.: US 12,193,132 B2
(45) Date of Patent: Jan. 7, 2025

(54) COOKING APPLIANCE

(71) Applicant: Samsung Electronics Co., Ltd., Suwon-si (KR)

(72) Inventors: Changhyun Lee, Suwon-si (KR); Seunghee Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 720 days.

(21) Appl. No.: 17/315,021

(22) Filed: May 7, 2021

(65) Prior Publication Data

US 2021/0352776 A1 Nov. 11, 2021

(30) Foreign Application Priority Data

May 8, 2020 (KR) ........................ 10-2020-0054961

(51) Int. Cl.
*H05B 6/64* (2006.01)
*F24C 15/00* (2006.01)
*F24C 15/20* (2006.01)

(52) U.S. Cl.
CPC ......... *H05B 6/6423* (2013.01); *F24C 15/006* (2013.01); *F24C 15/2035* (2013.01); *F24C 15/2042* (2013.01); *H05B 6/6402* (2013.01)

(58) Field of Classification Search
CPC ................ F24C 15/006; F24C 15/2042; F24C 15/2035; F24C 15/2007; H05B 6/6402; H05B 6/6423
See application file for complete search history.

(56) References Cited

U.S. PATENT DOCUMENTS

2016/0381741 A1* 12/2016 Lee ..................... F24C 15/2035 219/757

FOREIGN PATENT DOCUMENTS

| | | | | |
|---|---|---|---|---|
| CN | 106678994 | A | | 5/2017 |
| JP | H10-246504 | A | | 9/1998 |
| JP | 2004150738 | A | * | 5/2004 |
| JP | 6419424 | B2 | | 11/2018 |
| KR | 10-0214876 | B1 | | 8/1999 |
| KR | 20-0222051 | Y1 | | 5/2001 |
| KR | 20-0229268 | Y1 | | 7/2001 |
| KR | 20-0229350 | Y1 | | 7/2001 |
| KR | 10-0377726 | B1 | | 3/2003 |
| KR | 10-0377727 | B1 | | 3/2003 |
| KR | 10-2006-0125261 | A | | 12/2006 |
| KR | 10-0774502 | B1 | | 11/2007 |
| KR | 10-2017-0002046 | A | | 1/2017 |

OTHER PUBLICATIONS

International Search Report dated Aug. 12, 2021, in connection with International Application No. PCT/KR2021/005679, 3 pages.
Office Action issued Sep. 9, 2024, in connection with Korean Patent Application No. 10-2020-0054961, 15 pages.

* cited by examiner

*Primary Examiner* — Thien S Tran

(57) ABSTRACT

Provided is a cooking appliance including a grille frame with a filter fixing structure. The cooking appliance includes: a cabinet; a hood flow path formed inside the cabinet; a blower positioned in the cabinet to form an air flow inside the hood flow path; a filter positioned on the hood flow path to filter the air flow supplied from the blower; and a grille frame including an outlet discharging filtered air to an outside of the cabinet, and forming a plurality of support spaces, wherein a lower end of the filter is inserted in and supported by one support space of the plurality of support spaces.

20 Claims, 7 Drawing Sheets

COOKING APPLIANCE

CROSS-REFERENCE TO RELATED APPLICATION

This application is based on and claims priority under 35 U.S.C. § 119 to Korean Patent Application No. 10-2020-0054961 filed on May 8, 2020 in the Korean Intellectual Property Office, the disclosure of which is incorporated by reference herein in its entirety.

BACKGROUND

1. Field

The disclosure relates to a cooking appliance, and more particularly, to a cooking appliance with an improved filter support structure.

2. Description of the Related Art

A microwave oven is kitchen equipment for irradiating a high frequency to food to simultaneously heat and cook the inside and outside of the food. Because the microwave oven has high thermal efficiency, the microwave oven greatly shortens a cooking time of food, and reduces loss of nutritional value when defrosting or heating food. Also, the microwave oven is widely used because it can cook food stored in a container without taking the food out of the container.

Recently, an Over-The-Range (OTR) with a hood function being in charge of ventilation in the kitchen has been developed. The Over-The-Range requires a small installation space because it is mounted on the wall, and can more conveniently and efficiently cook food. The Over-The-Range is generally installed above a cooking appliance, such as a gas range or a Cooktop, mounted on the sink of the kitchen.

Accordingly, a filter for filtering an exhaust gas inhaled from the cooking appliance is installed inside the Over-The-Range.

SUMMARY

Therefore, it is an aspect of the disclosure to provide a cooking appliance including a grille frame with a filter supporting structure.

It is another aspect of the disclosure to provide a cooking appliance including a grille frame that is compatible with various models of cooking appliances.

Additional aspects of the disclosure will be set forth in part in the description which follows and, in part, will be obvious from the description, or may be learned by practice of the disclosure.

In accordance with an aspect of the disclosure, a cooking appliance includes a cabinet; a hood flow path formed inside the cabinet; a blower positioned in the cabinet to form an air flow inside the hood flow path; a filter positioned on the hood flow path to filter the air flow supplied from the blower; and a grille frame including an outlet discharging filtered air to an outside of the cabinet and forming a plurality of support spaces, wherein a lower end of the filter is inserted in and supported by a support space of the plurality of support spaces.

The grille frame may include a guide portion formed to guide air to the outlet, an elastic support portion protruding from the guide portion to support the filter, and a fixing support portion protruding from the guide portion and positioned above the elastic support portion, and the plurality of support spaces may include a first support space formed below the elastic support portion, and a second support space formed between the elastic support portion and the fixing support portion.

The elastic support portion may be elastically deformable in a vertical direction.

The lower end of the filter may be inserted in and supported by the first support space, and press the elastic support portion upward such that the elastic support portion is elastically deformed toward the second support space.

The filter may form a first angle or a second angle with respect to an upper surface of the cabinet, the second angle being different from the first angle, and a distance between an end of the fixing support portion and an end of the elastic support portion when the filter forms the first angle with respect to the upper surface of the cabinet may be different from a distance between the end of the fixing support portion and the end of the elastic support portion when the filter forms the second angle with respect to the upper surface of the cabinet.

The lower end of the filter may be inserted in and supported by the second support space.

The cooking appliance may further include a blowing duct defining an inside space that forms a part of the hood flow path.

The filter may be positioned inside the blowing duct.

The blowing duct may include a first supporting piece formed on a side surface of the blowing duct to support an upper end of the filter, and a second supporting piece formed on the side surface of the blowing duct to support a side portion of the filter.

When the lower end of the filter is inserted in the first support space, the lower end of the filter may be in contact with a bottom surface of the blowing duct, and, when the lower end of the filter is inserted in the second support space, the lower end of the filter may be spaced from the bottom surface of the blowing duct.

The grille frame may further include a grille portion extending from an end of the guide portion, and the outlet is formed in the grille portion.

The grille portion may be connected to an upper surface of the cabinet, and the outlet discharges air in an upward direction of the cabinet.

The grille frame may be positioned at a front side of the cabinet.

The cooking appliance may further include a door coupled with a front side of the cabinet to close and open the cabinet. The grille frame may be positioned between a top cover and the door.

The elastic support portion and the fixing support portion may be integrated into one body.

In accordance with another aspect of the disclosure, a hooded microwave oven includes: a flow guide formed inside a main body to guide a flow of air; a filter positioned on the flow guide to filter air guided by the flow guide; and an elastic support portion protruding from a first surface of the flow guide to fix the filter on the flow guide, wherein the elastic support portion is positioned to press a lower end of the filter upward or downward.

The hooded microwave oven may further include a first supporting piece protruding from a second surface of the flow guide to support an upper end of the filter.

The hooded microwave oven may further include a second supporting piece protruding from the second surface of the flow guide to support a side portion of the filter.

The lower end of the filter may be positioned below the elastic support portion, and the elastic support portion is positioned to press the lower end of the filter downward.

The hooded microwave oven may further include a fixing support portion protruding from the first surface of the flow guide to support the lower end of the filter, wherein the fixing support portion may be positioned above the elastic support portion, the lower end of the filter may be positioned between the fixing support portion and the elastic support portion, and the elastic support portion may be positioned to press the lower end of the filter upward.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
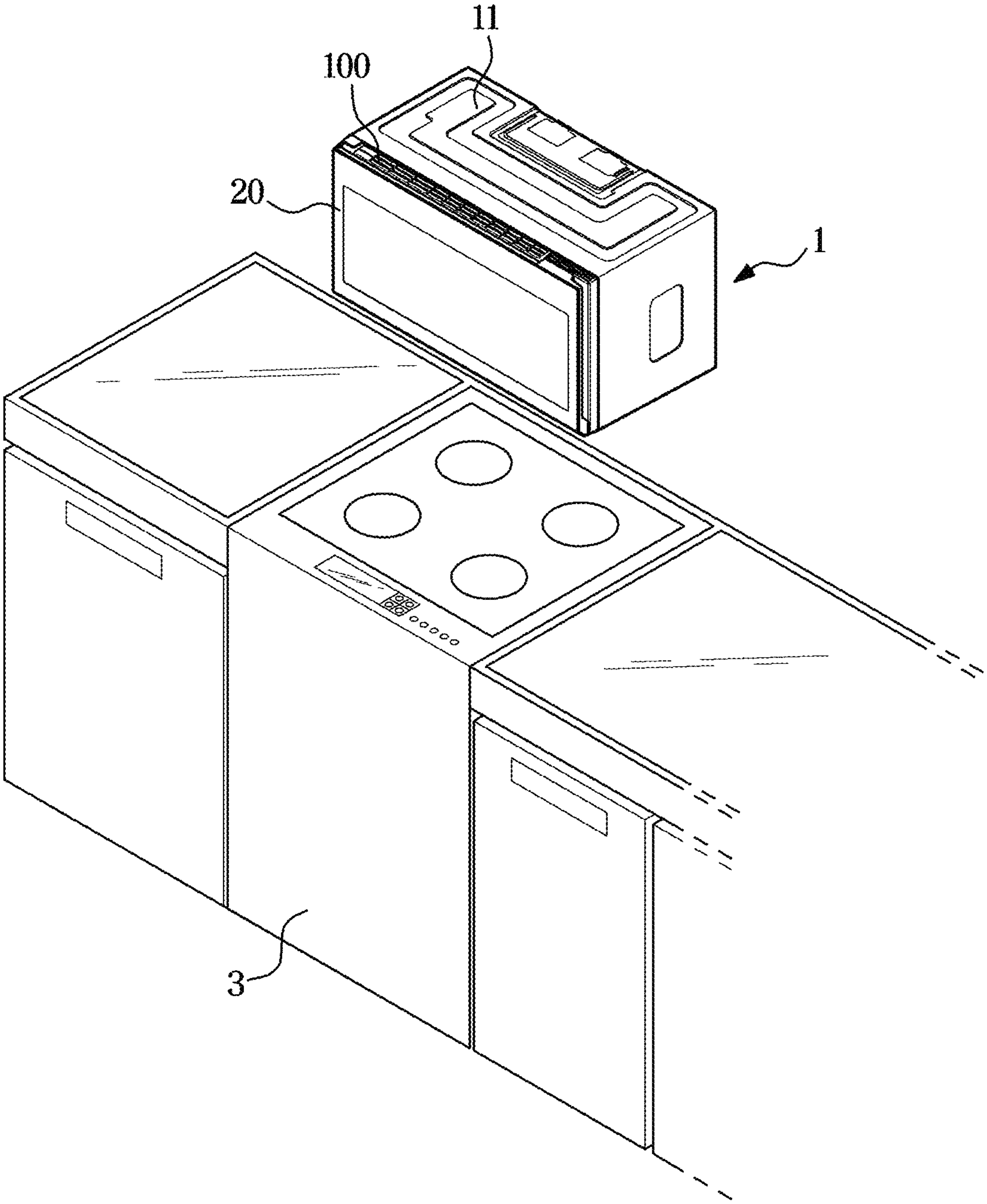
FIG. 1 illustrates an installation state of a microwave oven according to an embodiment of the disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Configurations illustrated in the embodiments and the drawings described in the present specification are only the preferred embodiments of the disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

Also, the terms used in the present specification are used to describe the embodiments of the disclosure, not for the purpose of limiting the disclosure. It is to be understood that the singular forms "a," "an," and "the" include plural referents unless the context clearly dictates otherwise.

It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof It will be understood that, although the terms "first", "second", etc., may be used herein to describe various components, these components should not be limited by these terms. The above terms are used only to distinguish one component from another.

For example, a first component discussed below could be termed a second component, and similarly, a second component may be termed a first component without departing from the teachings of the disclosure. As used herein, the term "and/or" includes any and all combinations of one or more of the associated listed items.

In the following description, the terms "front", "rear", "upper", and "lower" are defined based on the drawings, and the shapes and positions of the corresponding components are not limited by the terms.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the accompanying drawings.

Figure 2:
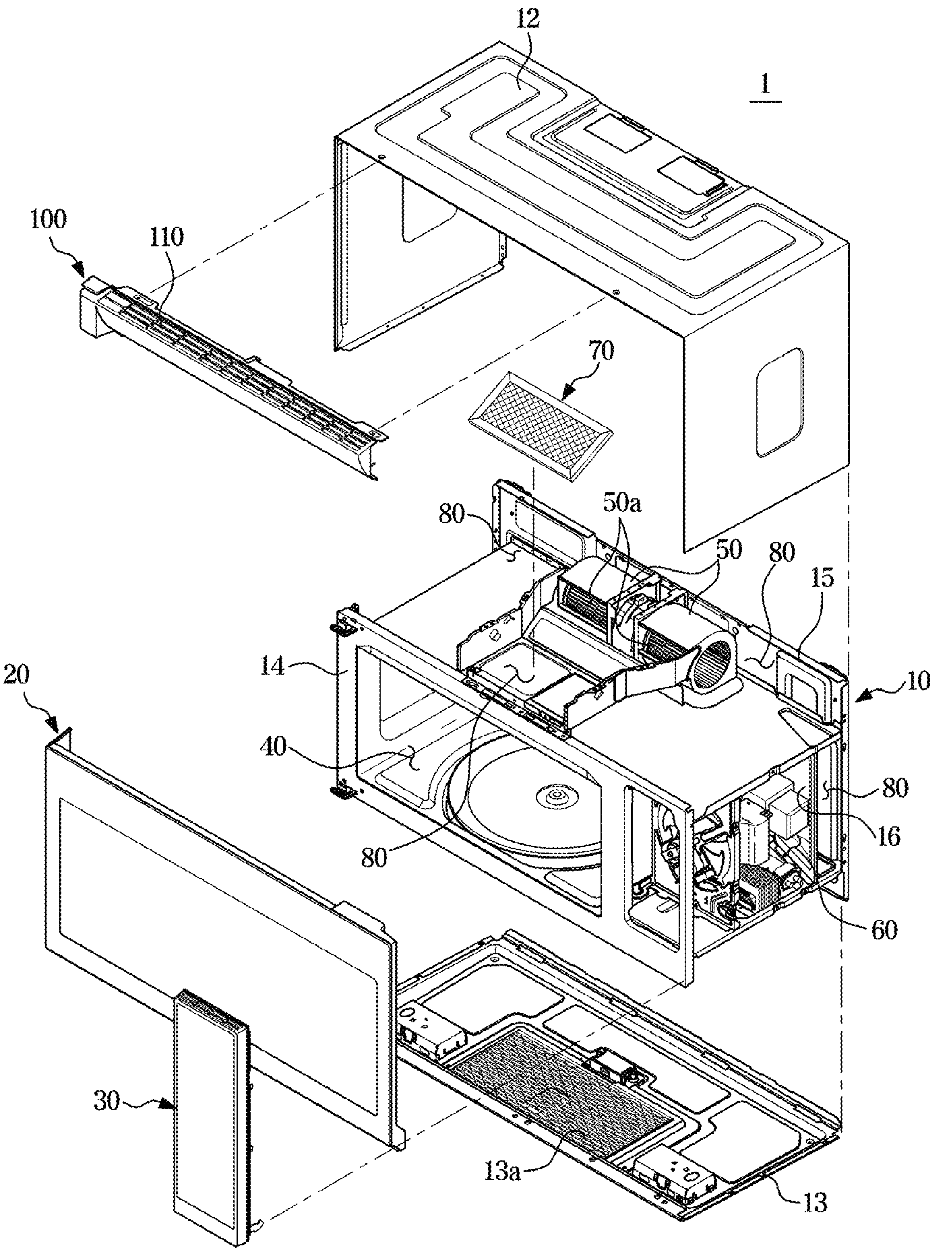
FIG. 2 is an exploded perspective view of the microwave oven illustrated in FIG. 1 according to embodiments of the disclosure.
Figure 3:
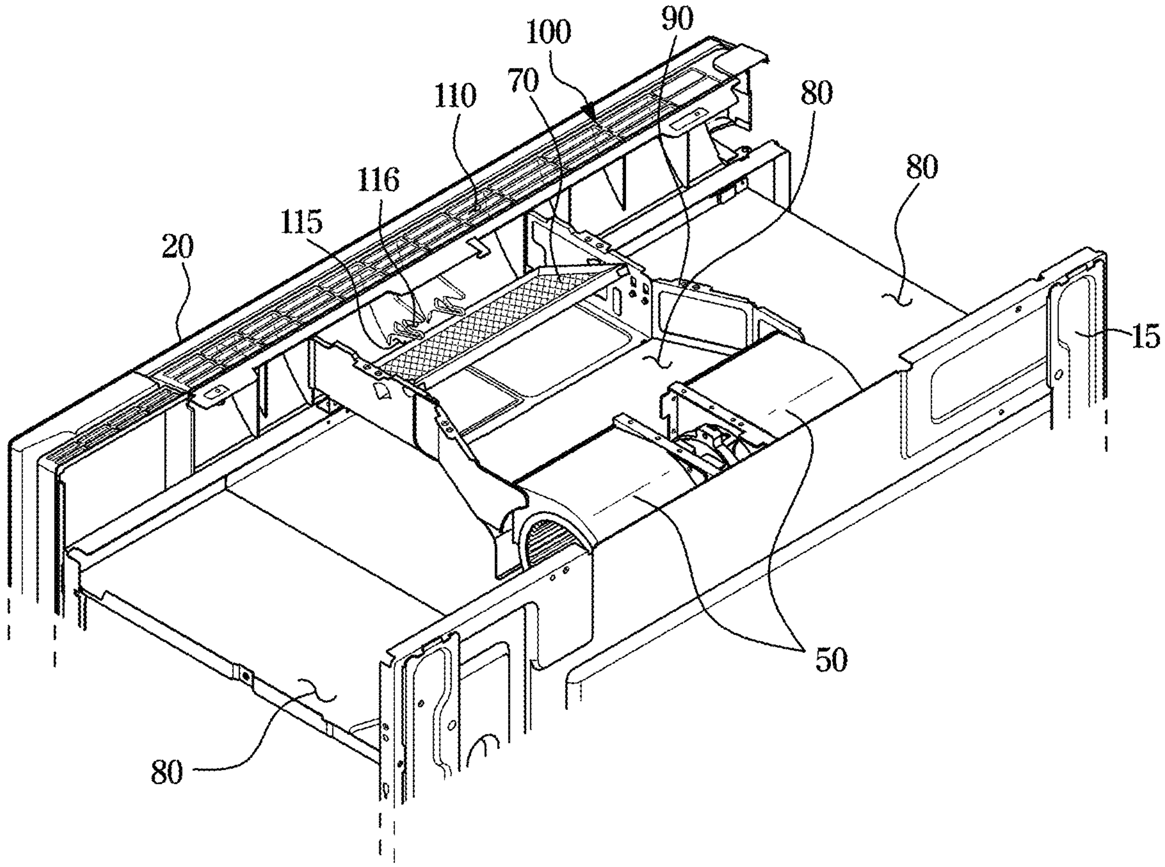
FIG. 3 illustrates the microwave oven illustrated in FIG. 1, from which a top cover is omitted according to embodiments of the disclosure.
Figure 4:
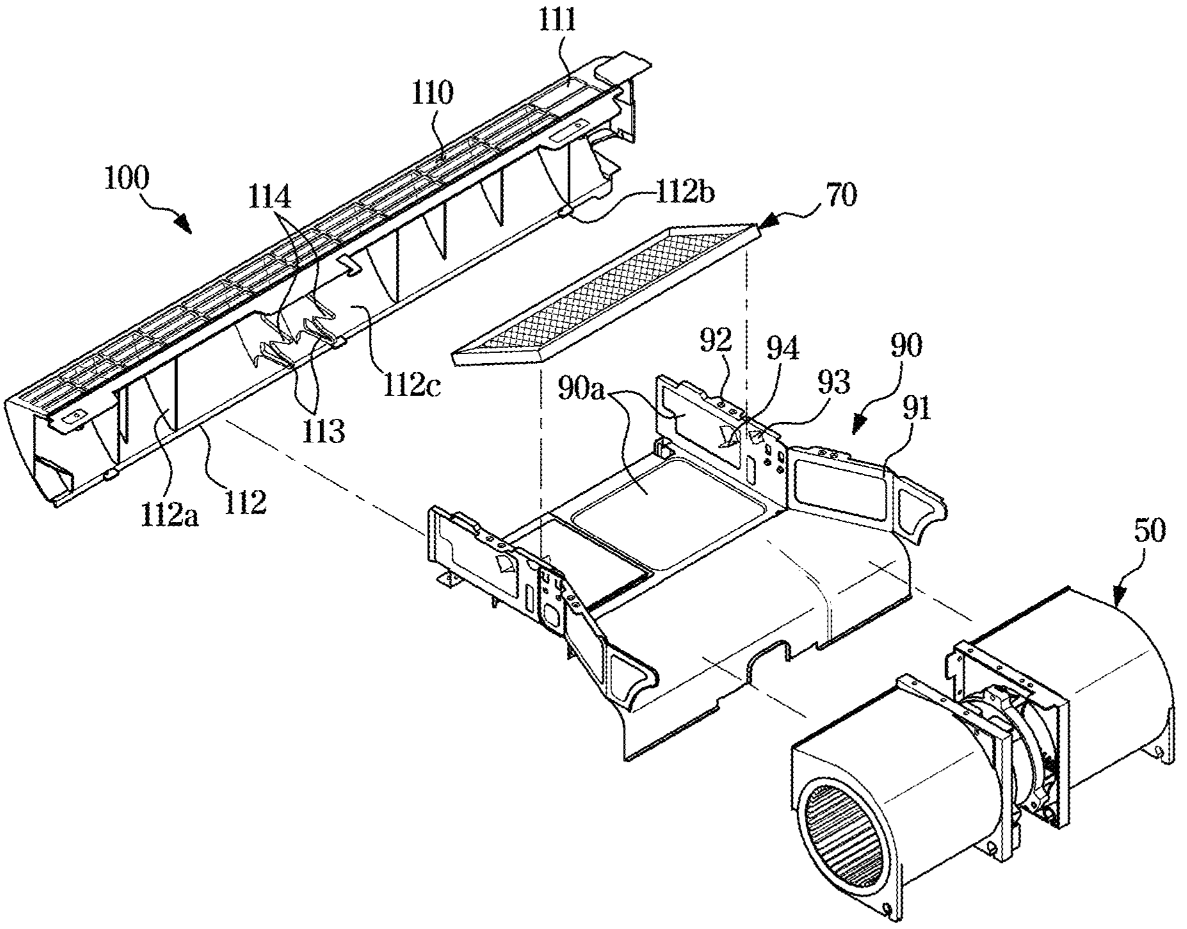
FIG. 4 is an exploded perspective view of some components of the microwave oven illustrated in FIG. 1 according to embodiments of the disclosure.
Figure 5:
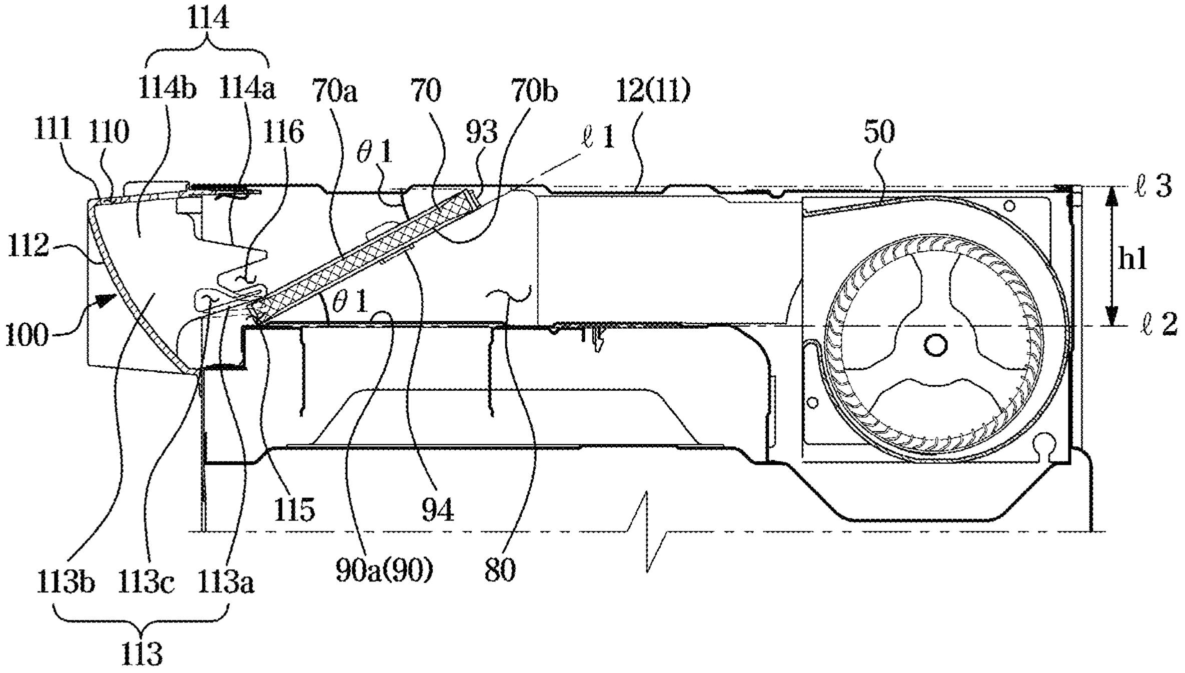
FIG. 5 is a side sectional view of the microwave oven illustrated in FIG. 1, showing a state in which a filter is inserted at a first angle in a first support space according to embodiments of the disclosure.

FIG. 1 illustrates an installation state of a microwave oven according to an embodiment of the disclosure. FIG. 2 is an exploded perspective view of the microwave oven illustrated in FIG. 1. FIG. 3 illustrates the microwave oven illustrated in FIG. 1, from which a top cover is omitted. FIG. 4 is an exploded perspective view of some components of the microwave oven illustrated in FIG. 1. FIG. 5 is a side sectional view of the microwave oven illustrated in FIG. 1, showing a state in which a filter is inserted at a first angle in a first support space.

In certain embodiments, a hooded microwave oven 1 is described as an example of a cooking appliance, however, any cooking appliance with a hood function may be applied.

Referring to FIGS. 1 to 5, the hooded microwave oven 1 may be installed above another cooking appliance 3. The hooded microwave oven 1 is called a wall-mount type microwave oven or an Over-The-Range (OTR), because it is mounted on a wall. Hereinafter, a microwave oven indicates the hooded microwave oven 1.

The microwave oven 1 may include a cabinet 11 forming an outer surface of a main body 10. The cabinet 11 may be positioned above the cooking appliance 3, and a rear surface of the cabinet 11 may be mounted on and fixed to a wall, although not limited thereto. However, a side surface or upper surface of the cabinet 11 may be mounted on the wall and fixed. Also, the microwave oven 1 may be mounted on the wall to be used as a wall-mounted type microwave oven, or may be placed on an installation surface and used, according to a user's selection.

The cabinet 11 may include a top cover 12 forming the upper and side surfaces of the cabinet 11, and a hood plate 13 forming a bottom surface of the cabinet 11 and including an inlet 13*a* for receiving an exhaust gas that is generated from the cooking appliance 3. The cabinet 11 may include a front frame 14 forming a front surface of the cabinet 11, and a rear plate 15 forming a rear surface of the cabinet 11. The top cover 12, the hood plate 13, the front frame 14, and the rear plate 15 may be provided separately or integrated with one or more of the components into one body.

The main body 10 may be partitioned into a cooking room 40 of which a front side opens to receive food, and a machine room 60 that is formed inside the main body 10 separated from the cooking room 40. Various electronic parts are installed in the machine room 60. More specifically, the top cover 12, the hood plate 13, the front frame 14, and the rear plate 15 may define the outer surfaces of the main body 10, and an entire or partial space between the cooking room 40 and the cabinet 11 may correspond to the machine room 60.

On a front surface of the cabinet 11, a door 20 hinge-coupled with the front surface of the cabinet 11 at its one edge may be installed to open and close the cooking room 40. The door 20 may cover the open front side of the cooking room 40. A tray (not shown) on which a cooking material is placed may be provided inside the cooking room 40, and a motor may be installed below the tray to rotate the cooking material together with the tray.

A control panel 30 may be coupled with the front surface of the cabinet 11 to enable a user to select an intensity of microwaves or an operating time according to an amount of a cooking material. The control panel 30 may be positioned beside the cooking room 40. The control panel 30 may be positioned behind the door 20 to be covered by the door 20 being in a closed state, although not limited thereto. However, the control panel 30 may be positioned beside the door 20 to be exposed to outside even though the door 20 is in a closed state.

Inside the cabinet 11, a hood flow path 80 may be formed through which air containing an exhaust gas inhaled through the inlet 13*a* flows. As shown in FIG. 2, a partition wall 16 for partitioning the hood flow path 80 from the machine room 60 may be provided in the microwave oven 1 to prevent air flowing through the hood flow path 80 from entering the machine room 60, although not limited thereto. However, the partition wall 16 may be omitted. In certain embodiments, the hood flow path 80 may be not partitioned from the machine room 60, and an entire or partial space between the cooking room 40 and the cabinet 11 may correspond to the hood flow path 80.

One end of the hood flow path 80 may communicate with the inlet 13*a*, and the other end of the hood flow path 80 may communicate with an outlet 110. Accordingly, when air including an exhaust gas enters the inlet 13*a* from the outside of the microwave oven 1, the air may move along the hood flow path 80 formed inside the main body 10 and be discharged to the outside of the microwave oven 1 through the outlet 110.

The microwave oven 1 may include a blower 50 for forming air flow inside the hood flow path 80 to perform a hood function. The blower 50 may be installed inside the cabinet 11. More specifically, the blower 50 may be installed at a rear, upper space inside the cabinet 11, and positioned on the hood flow path 80.

The blower 50 may include a cross-flow fan or a sirocco fan, although not limited thereto. However, the blower 50 may include another kind of fan. The blower 50 may have two vents 50*a*, and air may be discharged from the vents 50*a*.

The blower 50 may draw outside air including an exhaust gas generated from the cooking appliance 3 into the inside of the main body 10, and blow the drawn air to the outlet 110, wherein the drawn air moves through the hood flow path 80, arrives at the outlet 110, and is then discharged to the outside of the microwave oven 1.

The microwave oven 1 may include a blowing duct 90 forming a part of the hood flow path 80, the blowing duct 90 connecting the blower 50 to the outlet 110. More specifically, the hood flow path 80 formed inside the blowing duct 90 may be covered by the top cover 12 from above, and the hood flow path 80 formed inside the blowing duct 90 may be defined by the blowing duct 90 and the upper surface of the cabinet 11. An inner surface of the blowing duct 90 may correspond to a flow guide 112*c*, and air blown by the blower 50 may be guided to the outlet 110 by the flow guide 112*c*.

The blowing duct 90 may include a first duct 91 for collecting air discharged from the two vents 50*a* and guiding the air to concentrate the air toward the filter 70, and a second duct 92 in which the filter 70 is positioned. The blowing duct 90 may be formed by combining the first duct 91 and the second duct 92 provided separately, or the blowing duct 90 may be formed by the first duct 91 and the second duct 92 integrated into one body.

The filter 70 may be positioned on the hood flow path 80 to filter air flow supplied from the blower 50 and guided to the outlet 110 by the flow guide 112*c*. More specifically, the filter 70 may be positioned inside the blowing duct 90. The filter 70 may be in a shape of a rectangle having a horizontal length that is smaller than or equal to a width of the blowing duct 90. More specifically, the filter 70 may have a horizontal length that is smaller than or equal to the width of the second duct 92 of the blowing duct 90, although not limited thereto. However, the filter 70 may have another shape.

The filter 70 may be supported and fixed at an inclined position inside the blowing duct 90. In other words, a vertical position of the filter 70 may be inclined with respect to an inner surface 90*a* at the bottom of the blowing duct 90. This will be described in detail, later.

The microwave oven 1 may include a grille frame 100 including the outlet 110. The grille frame 100 may be positioned at a front side of the cabinet 11, and detachably coupled with the cabinet 11. More specifically, a lower end of a guide portion 112 of the grille frame 100 may be hook-coupled with the front side of the cabinet 11 by a hook 112*b*, and an upper end of the grille frame 100 may be screw-coupled with the upper surface of the cabinet 11.

The grille frame 100 may include a grille portion 111 in which the outlet 110 is formed, the guide portion 112 for guiding air toward the outlet 110, an elastic support portion 113 protruding from the guide portion 112, and a fixing support portion 114 protruding from the guide portion 112 and positioned above the elastic support portion 113.

The grille portion 111 may extend substantially horizontally from an upper end of the guide portion 112, and one end of the grille portion 111 may be connected to the upper surface of the cabinet 11 by screw-coupling. The outlet 110 may open in an upward direction of the cabinet 11, and accordingly, the outlet 110 may discharge air in the upward direction of the cabinet 11.

An outer surface of the guide portion 112 may form a front surface of the grille frame 100, and an inner surface of the guide portion 112 may correspond to the flow guide 112*c*. A plurality of reinforcing ribs 112*a* for preventing the grille frame 100 from being deformed may be formed between the guide portion 112 and the grille portion 111.

The flow guide 112*c* corresponding to the inner surface of the guide portion 112 may guide air blown in a horizontal direction by the blower 50 to the outlet 110 that opens in a vertical direction. That is, the flow guide 112*c* may change horizontal-direction air flow to vertical-direction air flow.

The grille frame 100 may include the elastic support portion 113 and the fixing support portion 114 that protrude from the inner surface of the guide portion 112. A plurality of elastic support portions 113 and a plurality of fixing support portions 114 may be provided.

The elastic support portion 113 and the fixing support portion 114 may be integrated into one body. More specifically, the elastic support portion 113 may include an elastic support portion protrusion 113*a* and an elastic support portion body 113*b*, and the fixing support portion 114 may include a fixing support portion protrusion 114*a* and a fixing support portion body 114*b*. The elastic support portion body 113*b* may protrude from the flow guide 112*c* of the guide portion 112, and the elastic support portion protrusion 113*a* may protrude from the elastic support portion body 113*b*. The elastic support portion protrusion 113*a* and the elastic support portion body 113*b* may be integrated into one body. The fixing support portion body 114*b* may protrude from the flow guide 112*c* of the guide portion 112, and the fixing support portion protrusion 114*a* may protrude from the fixing support portion body 114*b*. The fixing support portion protrusion 114*a* and the fixing support portion body 114*b* may be integrated into one body.

The elastic support portion body 113*b* and the fixing support portion body 114*b* may be integrated into one body 113*b* and 114*b*. In other words, the elastic support portion protrusion 113*a* and the fixing support portion protrusion 114*a* may protrude separately from the body 113*b* and 114*b*, although not limited thereto. However, the elastic support portion body 113*b* and the fixing support portion body 114*b* may be separated from each other. In certain embodiments, the elastic support portion 113 and the fixing support portion 114 may protrude separately from the flow guide 112*c* of the guide portion 112 in such a way to be spaced from each other.

The elastic support portion 113 may be elastically deformable in a vertical direction. Because a second support space 116 is formed above the elastic support portion protrusion 113*a* without any member, elastic deformation may occur toward the second support space 116.

Both ends of the elastic support portion protrusion 113*a* may be connected to the elastic support portion body 113*b*. The elastic support portion protrusion 113*a* may be in a shape of a band of which a cross section is a rectangle, and because both ends of the elastic support portion protrusion 113*a* are connected to the elastic support portion body 113*b*, the elastic support portion protrusion 113*a* may form a closed curve. Accordingly, the elastic support portion 113 may include a hollow space 113*c* formed between the elastic support portion body 113*b* and the elastic support portion protrusion 113*a*. Due to the hollow space 113*c* that is elastically deformed to change its shape, the elastic support portion protrusion 113*a* may be elastically deformed more flexibly, although not limited thereto.

However, when the elastic support portion body 113*b* is omitted, both ends of the elastic support portion protrusion 113*a* being in the shape of a band may be connected directly to the flow guide 112*c* of the guide portion 112. Also, the elastic support portion protrusion 113*a* may be in a shape of a band of which a cross section is another shape except for a rectangle, and may have another shape that is elastically deformable in the vertical direction, except for a band shape.

The fixing support portion protrusion 114*a* may be spaced from the elastic support portion protrusion 113*a* to form a space between the fixing support portion protrusion 114*a* and the elastic support portion protrusion 113*a*. When the elastic support portion protrusion 113*a* is not elastically deformed, a distance between the fixing support portion protrusion 114*a* and the elastic support portion protrusion 113*a* may be longer at longer distances from the elastic support portion body 113*b* and the fixing support portion body 114*b*.

The grille frame 100 may form at least one support space 115 and 116. The filter 70 may be inserted into and supported by the support space 115 and 116 at its lower end, thereby being fixed inside the blowing duct 90.

The support space 115 and 116 may include a first support space 115 formed below the elastic support portion 113, and a second support space 116 formed between the elastic support portion 113 and the fixing support portion 114. More specifically, the first support space 115 may correspond to a spacing between the inner surface 90*a* at the bottom of the blowing duct 90 and the elastic support portion protrusion 113*a*, and the second support space 116 may correspond to a spacing between the elastic support portion protrusion 113*a* and the fixing support portion protrusion 114*a*.

The filter 70 may be inclined with respect to the inner surface 90*a* at the bottom of the blowing duct 90. That is, a vertical position of the filter 70 may be inclined with respect to the inner surface 90*a* at the bottom of the blowing duct 90. In other words, the filter 70 may be inclined with respect to the upper surface of the cabinet 11. More specifically, the filter 70 may be inclined such that the lower end of the filter 70 is toward the front direction of the cabinet 11 and the upper end of the filter 70 is toward a rear direction of the cabinet 11. The lower end of the filter 70 may be inserted into and supported by one of the first support space 115 or the second support space 116 of the grille frame 100 provided in the front portion of the cabinet 11, thereby being fixed inside the blowing duct 90.

The blowing duct 90 may include a first supporting piece 93 and a second supporting piece 94, which protrude toward the inside of the blowing duct 90 from an inner side surface of the blowing duct 90, to support the filter 70 being in an inclined state. In other words, the first supporting piece 93 and the second supporting piece 94 may protrude from one surface of the flow guide 112*c*.

The first supporting piece 93 may support the upper end of the filter 70. More specifically, the first supporting piece 93 may have a supporting surface facing an upper surface of the filter 70 inclined to a preset gradient, and prevent the filter 70 from being pushed in the rear direction. The second supporting piece 94 may support a side portion of the filter 70. More specifically, the second supporting piece 94 may have a supporting surface facing a rear surface 70*b* of the filter 70 inclined to the preset gradient, and prevent the filter 70 from falling in the rear direction. A plurality of first supporting pieces 93 and a plurality of second supporting pieces 94 may be provided.

Figure 6:
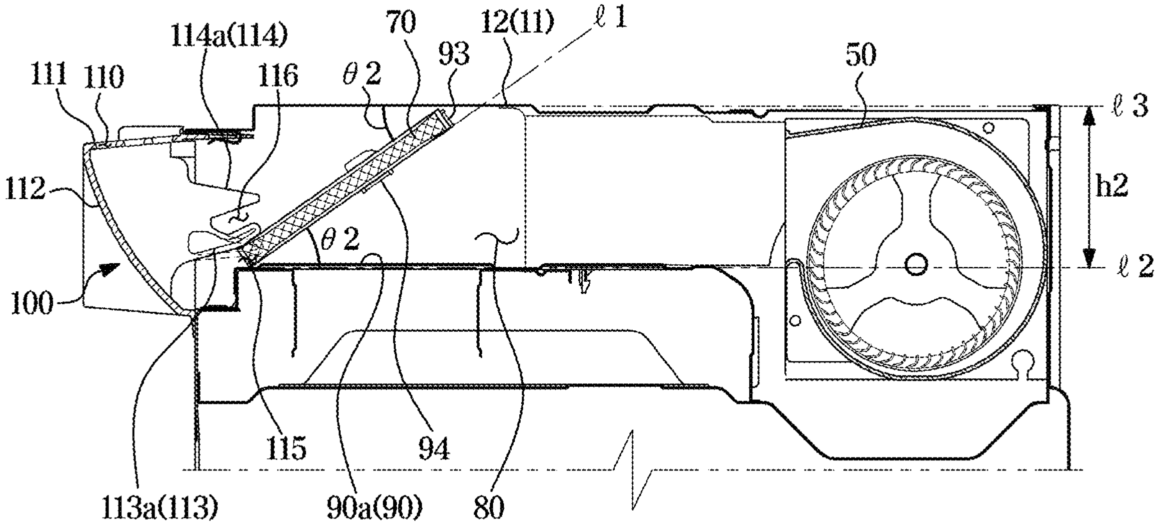
FIG. 6 is a side sectional view of the microwave oven illustrated in FIG. 1, showing a state in which the filter is inserted at a second angle in the first support space according to embodiments of the disclosure.
Figure 7:
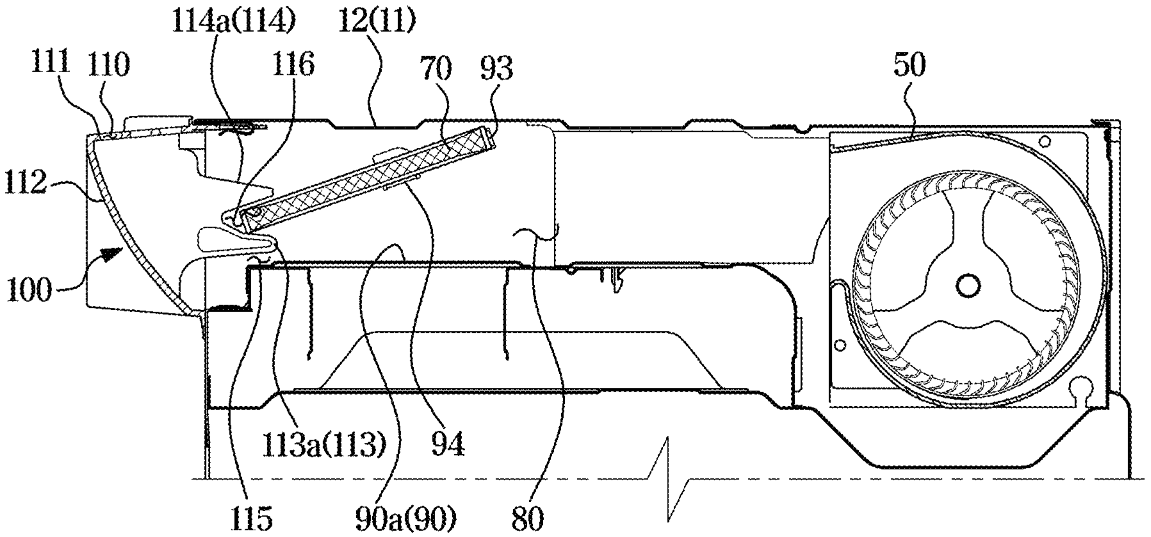
FIG. 7 is a side sectional view of the microwave oven illustrated in FIG. 1, showing a state in which the filter is inserted in a second support space according to embodiments of the disclosure.

FIG. 5 is a side sectional view of the microwave oven illustrated in FIG. 1, showing a state in which the filter is inserted at a first angle in the first support space. FIG. 6 is a side sectional view of the microwave oven illustrated in FIG. 1, showing a state in which the filter is inserted at a second angle in the first support space. FIG. 7 is a side sectional view of the microwave oven illustrated in FIG. 1, showing a state in which the filter is inserted in the second support space.

Hereinafter, a case in which the lower end of the filter 70 is inserted in the first support space 115 and a case in which the lower end of the filter 70 is inserted in the second support space 116 will be respectively described in detail.

Referring to FIGS. 5 to 7, the lower end of the filter 70 may be inserted into and supported by the first support space 115. In other words, the lower end of the filter 70 may be pushed into a space below the elastic support portion 113 and supported. More specifically, the lower end of the filter 70 may be pushed into and supported by a space below the elastic support portion protrusion 113*a*.

When the lower end of the filter 70 is inserted in the first support space 115, the lower end of the filter 70 may press the elastic support portion 113 upward. In other words, the lower end of the filter 70 may press the elastic support portion 113 upward such that the elastic support portion 113 is elastically deformed in a direction toward the second support space 116. More specifically, the lower end of the filter 70 may press the elastic support portion protrusion 113*a*.

The elastic support portion protrusion 113*a* elastically deformed by the filter 70 may press the lower end of the filter 70 downward. More specifically, an outer surface of the elastic support portion protrusion 113*a* may contact a lower end of a front surface 70*a* of the filter 70 to apply a restoring force to the lower end of the front surface 70*a* of the filter 70. Because the elastic support portion protrusion 113*a* has been elastically deformed upward, the restoring force may be applied in a direction of pressing the lower end of the filter 70 downward. The elastic support portion 113 may be positioned in front of the filter 70 to restrict a forward movement of the filter 70, and apply a restoring force to the lower end of the filter 70 to prevent the filter 70 from shaking by air flow.

The lower end of the filter 70 inserted into the first support space 115 may be firmly fixed on the hood flow path 80. Accordingly, the filter 70 may be prevented from deviating from its installation position by air flow generated by the blower 50 or from colliding with the blowing duct 90 to generate noise. Also, because the elastic support portion 113 fixing the filter 70 is removable from the filter 70 by separating the grille frame 100 from the cabinet 11, the filter 70 may be separable from the inside of the blowing duct 90. Therefore, the filter 70 may be easily installed and replaced with new one.

As described above, the filter 70 may be inclined with the inner surface 90*a* at the bottom of the blowing duct 90 in consideration of flow of air inside the blowing duct 90. In other words, the filter 70 may be inclined with respect to the upper surface of the cabinet 11, which is parallel to the inner surface 90*a* at the bottom of the blowing duct 90.

In certain embodiments, the lower end of the filter 70 may be in contact with or adjacent to a bottom surface of the second duct 92 and the upper end of the filter 70 may be in contact with or adjacent to the top cover 12 such that the entire surface of the filter 70 contacts air flowing inside the second duct 92 of the blowing duct 90. Accordingly, a shape resulting from projecting the filter 70 onto a rectangular section of the second duct 92 may be identical or similar to the section of the second duct 92.

The blowing duct 90 may have various shapes according to various factors, such as a specification of the blower 50, a size and output of the microwave oven 1, and a required air volume of the hood flow path 80. Accordingly, a width and height of the blowing duct 90 may have various values. That is, a horizontal length of a section of the blowing duct 90, which corresponds to the width of the blowing duct 90, and a vertical length of the section of the blowing duct 90, which corresponds to the height of the blowing duct 90 may have various values. The section of the blowing duct 90 may correspond to the section of the second duct 92.

Because the lower side of the filter 70 is positioned to correspond to the lower side of the section of the blowing duct 90 and the upper side of the filter 70 is positioned to correspond to the upper side of the section of the blowing duct 90, a greater height of the blowing duct 90 may result in a greater angle of the filter 70 formed with respect to the inner surface 90*a* at the bottom of the blowing duct 90. In other words, a greater height of the blowing duct 90 may result in a greater angle of the filter 70 formed with respect to the upper surface of the cabinet 11.

When the blowing duct 90 has a first height h1, an angle formed between a straight line 11 being parallel to a vertical side of the filter 70 and a straight line 12 being parallel to the inner surface 90*a* at the bottom of the blowing duct 90 may correspond to a first angle θ1. When the blowing duct 90 has a second height h2 that is greater than the first height h1, an angle formed between a straight line 11 being parallel to the vertical side of the filter 70 and the straight line 12 being parallel to the inner surface 90*a* at the bottom of the blowing duct 90 may correspond to a second angle θ2.

In other words, when the blowing duct 90 has the first height h1, an angle formed between the straight line 11 being parallel to the vertical side of the filter 70 and a straight line 13 being parallel to the upper surface of the cabinet 11 may correspond to the first angle θ1. When the blowing duct 90 has the second height h2 that is greater than the first height h1, an angle formed between the straight line 11 being parallel to the vertical side of the filter 70 and the straight line 13 being parallel to the upper surface of the cabinet 11 may correspond to the second angle θ2.

The second angle θ2 may be greater than the first angle θ1. An amount of elastic deformation of the elastic support portion 113 by the filter 70 when the second angle θ2 is formed may be greater than an amount of elastic deformation of the elastic support portion 113 by the filter 70 when the first angle θ1 is formed. Accordingly, a distance between an end of the elastic support portion protrusion 113*a* and the inner surface 90*a* at the bottom of the blowing duct 90 in the case that the second angle θ2 is formed may be longer than a distance between the end of the elastic support portion protrusion 113*a* and the inner surface 90*a* at the bottom of the blowing duct 90 in which the first angle θ1 is formed. Also, a distance between an end of the fixing support portion protrusion 114*a* and the end of the elastic support portion protrusion 113*a* in the case that the first angle θ1 is formed may be longer than a distance between the end of the fixing support portion protrusion 114*a* and the end of the elastic support portion protrusion 113*a* in the case that the second angle θ2 is formed, although not limited thereto.

However, the filter 70 may be inclined to various angles within an allowable range in the state in which the lower end of the filter 70 is inserted in the first support space 115 inside the blowing duct 90 having a preset height.

For example, when the blowing duct 90 has the first height h1, the filter 70 may be inclined to the first angle θ1 or smaller. According to another example, when the blowing duct 90 has the second height h2, the filter 70 may be inclined to the second angle θ2 or smaller. Accordingly, when the blowing duct 90 has the second height h2, the filter 70 may be inclined to the first angle θ1, as well as to the second angle θ2.

Because the elastic support portion 113 of the grille frame 100 is elastically deformed with different amounts of deformation according to gradients of the filter 70, the elastic support portion 113 may be compatible with various models of microwave ovens having different shapes of blowing ducts. Accordingly, the grille frame 100 according to the current embodiment of the disclosure may be applied to various models of microwave ovens, thereby achieving a cost reduction and simplification of a production process.

The lower end of the filter 70 may be inserted into and supported by the second support space 116. The lower end of the filter 70 may contact the fixing support portion protrusion 114*a* and the elastic support portion protrusion 113*a* and be supported. The fixing support portion protrusion 114*a* and the elastic support portion protrusion 113*a* may be positioned in front of the filter 70 to restrict a forward movement of the filter 70.

The lower end of the filter 70 may be pushed in the front direction by air flow from the blower 50 to press the elastic support portion protrusion 113*a*, or the lower end of the filter 70 may press the elastic support portion protrusion 113*a* according to a vertical length of the filter 70. The elastic support portion protrusion 113*a* elastically deformed downward by the filter 70 may press the lower end of the filter 70 upward and downward by a restoring force. Accordingly, the filter 70 may be in close contact with the first supporting piece 93 supporting the filter 70 at the upper end of the filter 70, and shaking of the filter 70 may be prevented. Also, although a force of the filter 70 that presses the elastic support portion protrusion 113*a* does not reach a degree of causing meaningful elastic deformation, the filter 70 may continue to be pushed forward by air flow from the blower 50, and accordingly, the elastic support portion protrusion 113*a* being in contact with the lower end of the filter 70 may apply a normal force to the filter 70.

When the lower end of the filter 70 is inserted into the second support space 116, the lower end of the filter 70 may be spaced from the inner surface 90*a* at the bottom of the blowing duct 90, and a part of air blown by the blower 50 may be discharged to the outside through the outlet 110 via the first support space 115, without passing through the filter 70.

When the filter 70 is installed in the second support space 116, a part of air blown by the blower 50 may flow to the outlet 110 without any resistance against the filter 70. Therefore, air may flow more smoothly than the case in which the filter 70 is installed in the first support space 115. Also, because the grille frame 100 supports the filter 70 in a selected one of the first support space 115 or the second support space 116 according to a specification of the microwave oven 1, the grille frame 100 may be used to manufacture different models of microwave ovens having various specifications.

The elastic support portion and the fixing support portion may be provided to prevent the filter from deviating from its original position by air flow from the blower or prevent noise from being generated due to shaking of the filter.

The filter may be supported by a selected one of a plurality of support spaces, and the grille frame may support the filter capable of being inclined to different angles according to elastic deformation of the elastic support portion.

Although the present disclosure has been described with various embodiments, various changes and modifications may be suggested to one skilled in the art. It is intended that the present disclosure encompass such changes and modifications as fall within the scope of the appended claims.

What is claimed is:

1. A cooking appliance comprising:

a cabinet;

a hood flow path formed inside the cabinet;

a blower positioned in the cabinet to form an air flow inside the hood flow path;

a filter positioned on the hood flow path to filter the air flow supplied from the blower; and a grille frame including an outlet formed to discharge the filtered air flow to an outside of the cabinet and forming a plurality of support spaces, wherein a lower end of the filter is inserted in and supported by a support space of the plurality of support spaces, wherein the grille frame comprises:

a guide portion forming a front of the grill frame and formed to guide the air flow to the outlet, an elastic support portion protruding from an inner side of the guide portion toward rear to support the filter, and a fixing support portion protruding from an inner side of the guide portion toward a rear and positioned above the elastic support portion, and the plurality of support spaces are formed by the elastic support portion and the fixing support portion.

2. The cooking appliance of claim 1, wherein:

the plurality of support spaces comprise:

a first support space formed below the elastic support portion, and a second support space formed between the elastic support portion and the fixing support portion.

3. The cooking appliance of claim 2, wherein the elastic support portion is elastically deformable in a vertical direction.

4. The cooking appliance of claim 3, wherein the lower end of the filter is inserted in and supported by the first support space, and presses the elastic support portion upward such that the elastic support portion is elastically deformed toward the second support space.

5. The cooking appliance of claim 4, wherein:

the filter forms a first angle or a second angle with respect to an upper surface of the cabinet, the second angle being different from the first angle, and a distance between an end of the fixing support portion and an end of the elastic support portion when the filter forms the first angle with respect to the upper surface of the cabinet is different from a distance between the end of the fixing support portion and the end of the elastic support portion when the filter forms the second angle with respect to the upper surface of the cabinet.

6. The cooking appliance of claim 2, wherein the lower end of the filter is inserted in and supported by the second support space.

7. The cooking appliance of claim 2, further comprising a blowing duct with an inside space that forms a part of the hood flow path.

8. The cooking appliance of claim 7, wherein the filter is positioned inside the blowing duct.

9. The cooking appliance of claim 8, wherein the blowing duct comprises:

a first supporting piece formed on a side surface of the blowing duct to support an upper end of the filter, and a second supporting piece formed on the side surface of the blowing duct to support a side portion of the filter.

10. The cooking appliance of claim 8, wherein:

when the lower end of the filter is inserted in the first support space, the lower end of the filter is in contact with a bottom surface of the blowing duct, and when the lower end of the filter is inserted in the second support space, the lower end of the filter is spaced from the bottom surface of the blowing duct.

11. The cooking appliance of claim 2, wherein:

the grille frame further comprises a grille portion extending from an end of the guide portion, and the outlet is formed in the grille portion.

12. The cooking appliance of claim 11, wherein:

the grille portion is connected to an upper surface of the cabinet, and the outlet discharges air in an upward direction of the cabinet.

13. The cooking appliance of claim 1, wherein the grille frame is positioned at a front side of the cabinet.

14. The cooking appliance of claim 1, further comprising a door coupled with a front side of the cabinet to close and open the cabinet, wherein the grille frame is positioned between a top cover and the door.

15. The cooking appliance of claim 2, wherein the elastic support portion and the fixing support portion are integrated into one body.

16. A hooded microwave oven comprising:

a grille frame including a flow guide formed on a rear side of the grille frame to guide a flow of air and forming a plurality of support spaces;

a filter positioned on the flow guide to filter air guided by the flow guide;

an elastic support portion protruding rearwards from the flow guide to fix the filter on the flow guide; and a fixing support portion protruding rearwards from the flow guide and positioned above the elastic support portion, wherein the elastic support portion is positioned to press a lower end of the filter upward or downward, and the plurality of support spaces are formed by the elastic support portion and the fixing support portion.

17. The hooded microwave oven of claim 16, further comprising a first supporting piece protruding from a second surface of the flow guide to support an upper end of the filter.

18. The hooded microwave oven of claim 17, further comprising a second supporting piece protruding from the second surface of the flow guide to support a side portion of the filter.

19. The hooded microwave oven of claim 18, wherein:

the lower end of the filter is positioned below the elastic support portion, and the elastic support portion is positioned to press the lower end of the filter downward.

20. The hooded microwave oven of claim 18, wherein the lower end of the filter is positioned between the fixing support portion and the elastic support portion, and the elastic support portion is positioned to press the lower end of the filter upward.

* * * * *